United States Patent Office 2,830,097
Patented Apr. 8, 1958

2,830,097

FLUORINATION OF A TELOMER OF TRICHLOROBROMOMETHANE AND VINYLIDENE CHLORIDE

Gilbert Gavlin and Richard Maguire, Chicago, Ill., assignors, by mesne assignments, to Ohmite Manufacturing Company, Incorporated, Chicago, Ill., a corporation of Illinois No Drawing. Application October 13, 1952
Serial No. 314,566

9 Claims. (Cl. 260—653)

This invention relates to a new method of substituting fluorine for other halogens and to the new chemical compounds resulting therefrom.

The present invention has as its object the substitution of fluorine for other halogens in aliphatic hydrocarbon molecules wherein alternate carbon atoms are completely substituted, one of the substituted groups being a halogen atom other than fluorine. Several fluorination methods and processes are known to the art, but it has been found that the standard fluorine substitution reactions are ineffective when applied to aliphatic hydrocarbon molecules in which alternate carbon atoms are fully substituted with groups, one of which groups is a halogen. More specifically, certain of the standard fluorine replacement reactions fail to give any substitution of fluorine whereas other standard substitution reactions produce polymerized tarry masses which are of no value.

A particular example of the problem which is solved by the present application is the substitution of fluorine for chlorine in an aliphatic hydrocarbon in which alternate carbon atoms are chlorinated, the polychlorinated hydrocarbon having a molecular weight such that it is a liquid at room temperatures. When such compounds are treated with a fluorine substituting agent such as antimony trifluoride at elevated temperatures in the presence of a relatively small proportion of pentavalent antimony salt, extensive decomposition occurs and a tarry product is obtained. Similar results are obtained when hydrogen fluoride is used in the presence of antimony pentachloride. Indeed these compounds are unstable toward antimony chloride alone at room temperature and even at 0° C., a tarry product being obtained. If standard substitution reactions are carried out at low temperatures, no reaction is obtained.

Accordingly it is an important object of the present invention to provide a method of substituting fluorine atoms for other halogen atoms in aliphatic hydrocarbon molecules in which alternate carbon atoms are fully substituted, one of the substituting groups being a halogen atom other than fluorine.

Another object is to produce new chemical compounds, these compounds being stable long chain hydrocarbons in which alternate carbon atoms are substituted with a fluorine atom.

In connection with the foregoing objects, it is another object of the invention to provide a method and to produce a new aliphatic hydrocarbon compound in which the compound has a molecular weight such that it is a liquid at room temperatures and is thermally stable.

Still another object of the invention is to provide a method of substituting fluorine atoms for other halogen atoms in long chain aliphatic hydrocarbons in which alternate carbons are fully substituted, one of the substituting groups being a halogen atom other than fluorine, the substitution being carried out substantially without polymerization of the reacting hydrocarbon compound.

A further object is to discover suitable reaction conditions for the above methods and the optimum conditions for obtaining high yields of the compounds produced thereby.

These and other objects and advantages of the invention will appear from the following description.

It has now been found that the above objects and advantages are obtained by reacting an aliphatic hydrocarbon compound in which alternate carbons are fully substituted, one of the substituting groups being a halogen other than fluorine, with a source of fluoride ions and pentavalent antimony ions, the proportion of fluoride ions and pentavalent antimony ions being such that there is at least one fluoride ion for each pentavalent antimony ion. The reaction may be carried out at 0° C. or lower or at an elevated temperature.

The present invention has particular utility when applied to compounds obtained by reacting an addition polymerizable vinylidene monoolefin with a chain transfer agent in the presence of a polymerization initiator, the polymerizable vinylidene monoolefin having the formula $CH_2=CR^1R^2$, wherein $R^1$ and $R^2$ are groups having a molecular weight greater than 4 which with the radical $H_2C=C<$ form a polymerizable vinylidene monoolefin, one of the groups $R^1$ or $R^2$ being a halogen from the group consisting of chlorine, bromine and iodine, the chain transfer agent being a compound ZY which will undergo reaction with the polymerizable vinylidene monoolefin under polymerization conditions in the presence of a polymerization initiator to give yields approaching 100% of the radical $Z[CH_2—CR^1R^2]$; to produce the compound $Z[CH_2—CR^1R^2]_nY$, wherein $n$ is an integer greater than one. The reaction may be carried out at a temperature of 0° C. or lower or at an elevated temperature and preferably at the autogenous pressure of the reaction mass although the reaction may be carried out at elevated pressures.

The above reaction produces low molecular weight products which are liquid at room temperature and which are particularly useful in the present invention. A preferred class of monoolefins are those in which $R^1$ and $R^2$ are both halogens and particularly halogens from the group consisting of fluorine, chlorine, bromine and iodine, at least one of the groups not being fluorine. A specific example of an addition polymerizable monoolefin which is particularly useful is vinylidene chloride.

The polymerization initiators that are suitable for making these polymerized compounds are any of the polymerization initiators known in the art for polymerizing this class of monomers. Particularly useful are the peroxides such as benzoyl peroxide, tertiary butyl peroxide, lauryl peroxide and acetyl peroxide. In general, any agent that decomposes thermally to give free radicals or causes the generation of free radicals is useful in initiating polymerization of this class of monomers. For example, ultraviolet light, lead tetraethyl and azides may also be used. Suitable chemical initiators are characterized by the fact that they produce free radicals by thermal decomposition and must decompose at the temperature of the reaction.

Chain transfer agents are utilized in the above reaction to control the size and the molecular weight of the product. Compounds useful as chain transfer agents in the above reaction are compounds of the type ZY wherein the bond between the portions of the molecule Z and Y is capable of symmetrical cleavage. All suitable chain transfer agents will react with the monomer under suitable polymerization conditions, to give a high yield approaching 100% of product that can be described by the addition of the radical Z· to the monomer. More particularly, a very high yield of the product $Z[CH_2—CR^1R^2]·$ will be obtained. All such compounds are operable for the purposes of this invention. A preferred class of compounds are halogenated aliphatic hydrocarbons and particularly halogenated methane. Chloroform and carbon tetrachloride are disclosed in the literature as suitable chain transfer agents but it has been found that these compounds are not easily adapted to the present reaction. On the other hand, trichlorobromomethane has proved to be a very satisfactory chain transfer agent, the active formula being $CCl_3-Br$.

The chain transfer agents described above and the monoolefins react in the presence of polymerization initiators to produce compounds of the general class $$Z[CH_2-CR^1R^2]_nY$$

wherein $R^1$, $R^2$, $Z$ and $Y$ are groups having the composition set forth above. $n$ is an integer greater than one. If the monomer is $CH_2=CCl_2$ the compounds generally are liquids when $n$ is a number from 2 to 10 and solids when $n$ is a number from 20 on up.

For a given set of polymerization conditions it has been found that the molecular weight of the product is directly proportional to the ratio of monomer to chain transfer agent. That is, the greater the amount of transfer agent used, the lower the molecular weight of the product obtained. Conversely, if a lesser amount of chain transfer agent is employed, then the molecular weight of the polymerized product is increased.

In order that the above reaction be better understood, the following example is given for purposes of illustration.

EXAMPLE I

A commercial sample of vinylidene chloride containing a polymerization inhibitor was washed with a 5% aqueous solution of sodium hydroxide to remove the inhibitor. The product from the extraction step was washed with water to remove any excess residual sodium hydroxide and thereafter dried over "Drierite" to remove the water. The resultant product was an actively polymerizable vinylidene chloride.

97.0 grams or 1 mole of the active polymerizable vinylidene chloride was mixed with 1980 grams or 10 moles of trichlorobromomethane and 2.42 grams or 0.01 mole of benzoyl peroxide. The mixture was then transferred to Pyrex pressure bottles and neoprene stoppers were wired on. The loaded bottles were placed in an oil bath maintained at a temperature of 70.5° C.±0.5° C. After 50 hours the bottles were removed from the bath and the product was cooled to room temperature. The cooled product was then filtered through a Buechner funnel to separate that portion of the product which was insoluble in the trichlorobromomethane solution. This portion of the product is hereinafter designated fraction I. The trichlorobromomethane was next removed from the filtrate by distillation at reduced pressures using an oil bath for heating. The last portion of solvent was removed at a pressure of 20 mm. Hg, absolute, at a maximum bath temperature of 70° C.

The product from the distillation step was a waxy residue. This residue was further separated into a liquid and a solid fraction by agitation with low boiling petroleum ether followed by filtration. The solid fraction removed by filtration will hereinafter be referred to as fraction II. The solvent was removed from the filtrate by distillation and a liquid polymer fraction was recovered. This liquid fraction is hereinafter referred to as fraction III.

This reaction yielded 34.0 grams of fraction I, 11.0 grams of fraction II, and 90.0 grams of fraction III. The molecular weights of the various fractions were determined by the boiling point or ebullioscopic method employing benzene as the solvent. The following values were obtained for the molecular weights: fraction I, 5,000±1,000; fraction II, 1,100±100; and fraction III, 500±50.

Fraction III was a liquid at room temperature, whereas fraction II was a solid melting at 30° to 40° C. and fraction I was a solid melting at about 140° C.

Fraction III constituted 65% of the total product. Tests showed that this fraction possessed insecticidal and fungicidal properties. In addition, this fraction as well as fractions I and II are valuable as intermediates in forming other substituted aliphatic hydrocarbons.

The product has the general structural formula $$CCl_3[CH_2-CCl_2]_nBr$$

It is to be understood that each of fractions I, II and III contain mixtures of homologs wherein $n$ has varying values. In the case of liquid fraction III the product is primarily a mixture of compounds wherein $n$ equals 3 and 4.

It will be seen that the vinylidene chloride utilized in the example conforms to the formula $CH_2=R^1R^2$ wherein $R^1$ and $R^2$ are groups having a molecular weight greater than 4 and which form an addition polymerizable monoolefin. More specifically, $R^1$ and $R^2$ are both chlorine atoms in this compound. Groups $R^1$ and $R^2$ may be other halogens such as bromine and iodine or can be carbon atoms, aliphatic and substituted aliphatic carbon radicals. It is further contemplated that groups $R^1$ and $R^2$ may be aromatic radicals such as benzene rings. At least one of the groups $R^1$ and $R^2$ must be a halogen other than fluorine.

The chain transfer agent utilized in the example is trichlorobromomethane. Other halogenated derivatives of aliphatic hydrocarbons may be used including halogenated ethanes, butanes and higher homologs. It has been found, however, that chloroform and carbon tetrachloride are generally unsuitable for the present reaction under the conditions described in the example. Examples of other suitable chain transfer agents are organic acids and acid anhydrides. Aldehydes may also be used such as formaldehyde and $Cl_3CCHO$. Alcohols and particularly the halogenated alcohols have also been found useful. Acyl halides and particularly acetyl chloride can be used. Various sulfonyl halides including thionyl chloride and alkyl mercaptans are useful.

In general, any compound is suitable as a chain transfer agent that will react with the monomer to be polymerized under polymerization conditions in the presence of a polymerization initiator to give an active radical which constitutes the polymer nucleus, one mole of the chain transfer agent reacting with one mole of the monomer to give substantially a 100% yield of the active radical. For example, if the chain transfer agent is a compound ZY and the monomer is the compound $CH_2=CR^1R^2$, equal molar quantities of these compounds will react under polymerization conditions in the presence of a polymerization initiator to produce a 100% yield of radical $Z[CH_2-CR^1R^2]\cdot$. It is possible to determine in this manner which of the many possible chain transfer agents is suitable for the particular monomer to be polymerized.

It is preferred to use a large excess of the chain transfer agent and to use the chain transfer agent as both a solvent and diluent. To this end preferably the monomer is soluble in the chain transfer agent. It is to be understood, however, that other diluents or solvents may be used and it is even contemplated that various dispersing agents be used to aid in the reaction.

In general, the molecular weight of the product is inversely proportional to the ratio between the amount of chain transfer agent and the amount of monomer utilized. Accordingly, ratios of chain transfer agent to monomer of 20 to 1 and higher can be utilized. When lesser ratios of chain transfer agent to monomer are utilized, products having relatively higher molecular weights are obtained.

The benzoyl peroxide used in the above example constitutes the polymerization initiator. According to the example, a concentration of 1 mole percent of benzoyl peroxide based on the monomer is utilized. It has been found that as little as 0.01 mole percent and up to 5 mole percent or more can be used effectively. Other peroxides form a preferred class of polymerization initiators, examples of suitable peroxides in addition to benzoyl peroxide being tertiary butyl peroxide, lauryl peroxide and acetyl peroxide. In general, any polymerization initiator may be used, the only requirements being that the compounds decompose thermally to give free radicals at the temperature of the reaction. Other suitable polymerization initiators or catalysts are ultra violet light, lead tetraethyl and various azides. The quantity of initiator utilized will be dependent upon the particular characteristics of the initiator, these characteristics being well known in the art and forming no part of the present invention.

The temperature at which the polymerization is carried out is the temperature at which the initiator decomposes to form free radicals. In the case of benzoyl peroxide the temperature may be as low as 60° C. and as high as 100° C. Various compounds such as aromatic amines may be added to lower the reaction temperature; in fact aromatic amines make it possible to utilize temperatures as low as 0° C. It will be seen that the temperature of the reaction will depend upon the polymerization initiator employed, the temperature for any given initiator being well known and forming no part of the present invention.

Preferably, the polymerization reaction is carried out in sealed vessels utilizing the autogenous pressure of the reactants. It is to be understood that the reaction can be carried out at lower or higher pressures, the pressure of Example I being approximately 50 pounds per square inch. In general, the pressure would depend upon the particular solvent or diluent and chain transfer agent utilized, the temperature largely determining the pressure for any given mixture.

50 hours has been given as the reaction time in Example I. It has been found that a reaction time of as little as 24 hours or less produces a suitable product and successful products have been obtained from reactions lasting 100 hours or more.

The present invention contemplates the replacement of part or all of the halogen atoms of the above products with fluorine by substitution type reaction. This reaction in general includes the steps of preparing the fluorinating agent, the fluorination or substitution action and the recovery and purification of the reaction products.

The fluorination step of the present invention is applicable to all products derived from the reaction of Example I and to other aliphatic hydrocarbon molecules wherein alternate carbon atoms are completely substituted, one of the substituted groups being a halogen atom other than fluorine. For the purposes of illustration several examples of fluorination reactions will be given as applied to fraction III of Example III. It is to be understood that the selection of this particular product as a starting material is merely for the purposes of illustration and is not to be construed as a limitation of the invention.

EXAMPLE II

Preparation of the fluorinating agent 51 gm. (.027 m.) of antimony trifluoride are placed in 60 ml. of 1,1,2-trichloro-1,2,2-trifluoro ethane in a suitable container. Next 36 gm. (0.1 m.) of antimony pentachloride are added to the solution. The resultant mixture was refluxed for two hours on an oil bath which was maintained at a temperature of 60° C. Next the solution was cooled and the supernatant liquid was decanted.

Fluorination

The supernatant liquid containing the fluorinating agent from the above step was decanted into a three necked, round bottom flask equipped with an addition tube, a reflux condenser and a stirrer. 15 gm. of polyvinylidene chloride product from Example I, fraction III, was dissolved in 40 ml. of 1,1,2-trichloro-1,2,2-trifluoro ethane. This solution was added in a dropwise manner at room temperature to the flask and mixed with the fluorinating solution described above. The contents of the flask were refluxed at 60° C. for 4.5 hours. It was noted that chlorine was liberated during the reaction. After refluxing was finished, the contents of the flask were cooled at room temperature.

Recovery of products

The product from the preceding step was freed of antimony salts by repeated washing with dilute (5 N) hydrochloric acid. The washed product was then further washed with water and then dried over "Drierite". The different series of operations produced a solution having insoluble materials suspended therein. The solution was filtered, both the filtrate and residue bing retained. The filtrate was distilled to remove the 1,1,2-trichloro-1,2,2-trifluoro ethane and produced a product hereafter referred to as product I that weighed 10.8 gm. Product I was a liquid and thermally stable at 160° C. The residue from the filtration step was extracted with ethyl ether, this extraction yielding 2.0 gm. of tarry material that was insoluble in 1,1,2-trichloro-1,2,2-trifluoro ethane. This product is hereafter referred to as product II.

The antimony pentachloride used above provides a source of pentavalent antimony ions. These ions serve as catalysts in the fluorine substitution reaction. The antimony trifluoride serves as a source of fluoride ions thereby providing the necessary fluoride ions for substitution. It is to be noted that there must be sufficient fluoride ions present so that theoretically there is no antimony pentachloride present as such in the reaction mass at any time during the reaction. Accordingly a large excess of fluoride ion is provided. If a sufficient amount of fluoride ion is not present the reaction mass tends to polymerize to form a high proportion of undesirable tarry product.

Other suitable compounds can be utilized as a source of fluoride ions including hydrogen fluoride, silver fluoride, tellurium fluoride, mercurous fluoride, or mixtures of these fluorides. Antimony trifluoride is the preferred source of fluoride ions, the compounds given above being more or less effective depending upon the particular compound being treated.

The temperature of the reaction mass in preparing the fluorinating agent is the reflux temperature of the solvent. 1,1,2-trichloro-1,2,2-trifluoro ethane is the prefered solvent in the above reaction since it is inert to all materials used and particularly the fluorinating agents. Any other solvent having these desirable qualities can be substituted for the 1,1,2-trichloro-1,2,2-trifluoro ethane. The reaction between the antimony pentachloride and the source of fluoride ion can be carried out successfully in as short a time as fifteen minutes or for as long as up to two hours or more.

The fluorination reaction is preferably carried out at the reflux temperature of the solvent as described in the above example but can be carried out at lower or at higher temperatures as will be more fully pointed out hereinafter. Any suitable solvent can be used to dissolve the polyvinylidene chloride; the solvent must be inert to the fluorinating agents.

Other methods of recovering the products will be apparent to those skilled in the art and accordingly the invention is not to be limited to the particular series of recovery steps given in the example. The products are suitable as intermediates in forming other compounds and particularly in forming compounds that are very stable at high temperatures and have good dielectric properties.

EXAMPLE III 144 gm. (0.8 m.) of antimony trifluoride was ground in a mortar and was transferred to a 500 ml. three-necked round bottom flask provided with a Hershberg stirrer (copper wire impeller), an addition tube for liquids, and a water cooled reflux condenser having a drying tube at its outlet. Antimony pentachloride, 120 gm. (0.4 m.) was added and the mixture was agitated while being heated on an oil bath to 150° C. during a two hour period. The product was then cooled at 35° C. A clear orange liquid was then obtained that became very viscous at 35° C. Agitation was continued while 1,1,2-trichloro-1,2,2-trifluoro ethane was added in 50 ml. portions. During the addition of the second portion a vigorous change occurred and the viscous liquid was converted to a finely divided light tan solid that was easily dispersed by the stirrer. A 1,1,2-trichloro-1,2,2-trifluoro ethane solution of polyvinylidene chloride (fraction III from Example I above) of gradually increasing concentration was added directly to the antimony chlorofluoride mixture at room temperature. A total of 44 gm. of polymer was added along with 300 ml. of 1,1,2-trichloro-1,2,2-trifluoro ethane. The mixture was heated first for twenty hours at 30° C., then for four hours at 40° C., and then for an additional one-half hour at 50° C. The 1,1,2-trichloro-1,2,2-trifluoro ethane solution was decanted from the insoluble antimony salts. These insoluble salts were washed repeatedly with portions of 1,1,2-trichloro-1,2,2-trifluoro ethane. The washings and the original solution were combined and the 1,1,2-trichloro-1,2,2-trifluoro ethane was removed by distillation. This produced 17.5 gm. of a product which will hereinafter be called product I. The residue of the insoluble antimony salts was dissolved in 5 N hydrochloride acid and then extracted with 1,1,2-trichloro-1,2,2-trifluoro ethane. The solution was decanted and distilled to remove the 1,1,2-trichloro-1,2,2-trifluoro ethane yielding 2.2 gm. of product that hereinafter will be called product II. The residue was then extracted with ethyl ether to recover 2.2 gm. of ether soluble tar hereinafter called product III.

EXAMPLE IV

Antimony trifluoride 144 gm. (0.8 m.), was ground in a mortar and transferred to a 500 ml. three necked, round bottom flask fitted with a Hershberg stirrer (copper wire impeller), an addition tube for liquids, and a water cooled reflux condenser having a drying tube at its outlet. Antimony pentachloride, 120 gm. (0.4 m.), was added and the mixture was agitated while being heated on an oil bath to 150° C. during a two hour period. The product was a clear orange liquid which became very viscous when cooled to 35° C. Agitation was continued while 1,1,2-trichloro-1,2,2-trifluoro ethane was added in 50 ml. portions. During the addition of the second portion, a vigorous change occurred and the viscous liquid was converted to a finely divided light tan solid which was easily dispersed by the stirrer. A solution of polyvinylidene chloride (fraction III from Example I) was dissolved in a mixture of 1,1,2-trichloro-1,2,2-trifluoro ethane and carbon tetrachloride (3 parts by volume of 1,1,2-trichloro-1,2,2-trifluoro ethane to one part by volume of carbon tetrachloride). Solutions of gradually increasing concentration of polymer were added to the antimony chlorofluoride mixture at room temperature. A total of 44 gms. of polymer was added along with 300 ml. of 1,1,2-trichloro-1,2,2-trifluoro ethane and 100 ml. of carbon tetrachloride. The resulting mixture was colled to 0° C. and the temperature maintained there for thirty-six hours. The product was recovered as set forth in Example III above, yielding the following amounts of the various products:

|  | Grams |
|---|---|
| Product I | 23.53 |
| Product II | 2.62 |
| Product III | 1.25 |

The carbon tetrachloride in the above example serves to dissolve certain of the polymer components that are relatively insoluble in 1,1,2-trichloro-1,2,2-trifluoro ethane at 0° C. Any other suitable solvent that would dissolve these components and which would be inert to the fluorinating agents under the conditions encountered would be suitable to replace the carbon tetrachloride.

It has further been found that the fluorination time in Example IV can be reduced to as low as eight hours to give a satisfactory product and the reaction time can be increased above thirty-six hours.

In all the above fluorination examples it is important that the antimony trifluoride or other source of fluoride ion be present in a quantity so that substantially no antimony pentachloride is present as such at any time during the reaction. It is postulated that the antimony trifluoride and the antimony pentachloride react as follows:

$$SbF_3 + SbCl_5 \rightarrow SbFCl_2 + SbF_2Cl_3$$

The antimony difluorotrichloride then reacts with the chlorinated product from Example I as follows:

$$CCl_3-CH_2-CCl_2-CH_2-CCl_2-\\CH_2-CCl_2Br + SbF_2Cl_3 \rightarrow CFCl_2-\\CH_2-CClF-CH_2-CCl_2F + SbCl_4Br$$

The particular chlorinated product shown is merely illustrative, the other homologues of this product reacting in a similar way.

It is important that the antimony pentachloride and antimony trifluoride be reacted with each other before addition to the polymer solution. Addition of the antimony pentachloride by itself to the polymer solution even in low concentration yields a tar. The antimony pentachloride and the antimony trifluoride can be reacted at temperatures ranging from 0° to 150° C.

The products from the fluorination reactions have the general formula:

$$Z[CH_2-CXF]_nY$$

where X is a halogen and preferably chlorine, $n$ is an integer and Z and Y are any groups that will form a stable non-polymerizable compound. A common group of compounds made according to the present invention are those having the structural formula:

$$CX^1X^2X^3[CH_2-CXF]_nX^4$$

wherein $n$ is an integer greater than one, and X, $X^1$, $X^2$, $X^3$ and $X^4$ are halogens.

In addition to substituting fluorine for chlorine it has been found that hydrogen bromide is given off when the starting compound is $$CCl_3-CH_2-CCl_2-CH_2-CCl_2-CH_2-CCl_2Br$$

This produces an unsaturated double bond in the product. This compound may constitute as much as 10 percent of the total product. It is postulated that the double bond is formed in the 1-position by merely splitting off hydrogen bromide.

In general, only one chlorine is replaced on each carbon atom even though two or more chlorine atoms may be attached thereto. Accordingly it is postulated that fluorine atoms are substantially uniformly distributed along the hydrocarbon chain. A halogen analysis of the products I from Examples III and IV gives the following results:

| | Fluorine (Percent by wt.) | Other halogens (Percent by wt.) |
|---|---|---|
| Example 3 | 25.5 | 49.2 |
| Example 4 | 25.4 | 52.3 |

It will be seen that new compounds and methods of preparing these compounds have been produced that fulfill all of the objects and advantages set forth above. Although certain examples have been given for the purposes of illustration, it is to be understood that various changes and modifications can be made therein without departing from the spirit and scope of the invention. Accordingly, the invention is to be limited only as set forth in the following claims.

The invention is hereby claimed as follows:

1. A compound having the formula $$CFCl_2[CH_2-CClF]_nBr$$

wherein $n$ is an integer greater than one.

2. A compound having the formula $$CFCl_2[CH_2-CClF]_nCH=CFCl$$

wherein $n$ is an integer.

3. A method of preparing a compound having the formula $$CFCl_2[CH_2-CClF]_nBr$$

wherein $n$ is an integer greater than one, said method comprising providing a compound having the formula $$CCl_3[CH_2-CCl_2]_mBr$$

wherein $m$ has the same value as $n$ and reacting the last mentioned compound with a fluorinating agent, said fluorinating agent being the product of a reaction at an elevated temperature between antimony pentachloride and antimony trifluoride, the ratio of said antimony pentachloride and said antimony trifluoride being such that the number of available fluorine ions will exceed the number of pentavalent antimony ions present at any time during the reaction of said fluorinating agent with the compound having the last mentioned formula.

4. A method according to claim 3 in which said compound having the second formula and said fluorinating agent are reacted in a non-polar solvent that is inert to said fluorinating agent.

5. A method according to claim 3 in which said compound having the second formula and said fluorinating agent are reacted at a temperature between about 0° C. and about 100° C.

6. A method according to claim 4 in which said solvent is 1,1,2-trichloro-1,2,2-trifluoro ethane.

7. An unsaturated organic compound, said compound being the product of a reaction between a compound having the formula $$CCl_3-CH_2-CCl_2-CH_2-CCl_2-CH_2-CCl_2Br$$

and a fluorinating agent, said fluorinating agent being the product of a reaction at an elevated temperature between antimony pentachloride and antimony trifluoride, the ratio of said antimony pentachloride and said antimony trifluoride being such that the number of available fluoride ions will exceed the number of pentavalent antimony ions present at any time during the reaction of said fluorinating agent with the compound having the above indicated formula, said reaction of said fluorinating agent with the compound having the above indicated formula effecting both a splitting off of hydrogen bromide from and substitution of fluorine only for chlorine in the compound having the above indicated formula.

8. A method of preparing an unsaturated organic compound which comprises effecting a reaction between a compound having the formula $$CCl_3-CH_2-CCl_2-CH_2-CCl_2-CH_2-CCl_2Br$$

and a fluorinating agent, said fluorinating agent being the product of a reaction at an elevated temperature between antimony pentachloride and antimony trifluoride, the ratio of said antimony pentachloride and said antimony trifluoride being such that the number of available fluoride ions will exceed the number of pentavalent antimony ions present at any time during the reaction of said fluorinating agent with the compound having the above indicated formula, said reaction of said fluorinating agent with the compound having the above indicated formula effecting both a splitting off of hydrogen bromide from and substitution of fluorine only for chlorine in the compound having the above indicated formula.

9. A method of preparing both an unsaturated organic compound and a compound having the formula $$CFCl_2[CH_2-CClF]_3Br$$

said method comprising effecting a reaction between a compound having the formula $$CCl_3-CH_2-CCl_2-CH_2-CCl_2-CH_2-CCl_2Br$$

and a fluorinating agent, said fluorinating agent being the product of a reaction at an elevated temperature between antimony pentachloride and antimony trifluoride, the ratio of said antimony pentachloride and said antimony trifluoride being such that the number of available fluoride ions will exceed the number of pentavalent antimony ions present at any time during the reaction of said fluorinating agent with the compound having the above indicated formula, said reaction of said fluorinating agent with the compound having the above indicated formula effecting both a splitting off of hydrogen bromide from and substitution of fluorine only for chlorine in the compound having the second above indicated formula, said splitting off of hydrogen bromide yielding said unsaturated organic compound and being confined to only a portion of the compound having the first above indicated formula.

References Cited in the file of this patent

UNITED STATES PATENTS

| | | |
|---|---|---|
| 2,440,800 | Hanford | May 4, 1948 |
| 2,440,801 | Hanford | May 4, 1948 |
| 2,468,208 | Kharasch | Apr. 26, 1949 |
| 2,490,764 | Benning | Dec. 13, 1949 |
| 2,497,046 | Kropa | Feb. 7, 1950 |
| 2,510,872 | Downing | June 6, 1950 |
| 2,705,706 | Dittman et al. | Apr. 5, 1955 |
| 2,744,147 | Milks | May 1, 1956 |

OTHER REFERENCES

"Fluorine Chemistry" (Dr. J. H. Simons); published by Academic Press Inc., 1950, page 500 relied on.